US007870251B2

(12) United States Patent
Streijl

(10) Patent No.: US 7,870,251 B2
(45) Date of Patent: Jan. 11, 2011

(54) DEVICES, METHODS, AND COMPUTER PROGRAM PRODUCTS FOR REAL-TIME RESOURCE CAPACITY MANAGEMENT

(75) Inventor: Robert C. Streijl, Cumming, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 449 days.

(21) Appl. No.: 11/972,133

(22) Filed: Jan. 10, 2008

(65) Prior Publication Data

US 2009/0182878 A1 Jul. 16, 2009

(51) Int. Cl.
*G06F 15/173* (2006.01)
(52) U.S. Cl. .................. 709/224; 709/202; 709/217; 709/220; 709/226; 709/248
(58) Field of Classification Search .................. 709/202, 709/217, 220, 223, 248, 224, 225, 226
See application file for complete search history.

(56) References Cited

U.S. PATENT DOCUMENTS

| | | | | |
|---|---|---|---|---|
| 5,341,477 A * | 8/1994 | Pitkin et al. | ................. | 709/226 |
| 6,128,644 A * | 10/2000 | Nozaki | ...................... | 709/203 |
| 6,430,617 B1 * | 8/2002 | Britt et al. | ................... | 709/224 |
| 6,625,643 B1 * | 9/2003 | Colby et al. | ................ | 709/217 |
| 6,681,232 B1 * | 1/2004 | Sistanizadeh et al. | ............. | 1/1 |
| 7,046,680 B1 * | 5/2006 | McDysan et al. | ........... | 370/396 |
| 7,051,098 B2 * | 5/2006 | Masters et al. | ............. | 709/224 |
| 7,069,337 B2 * | 6/2006 | Rawlins et al. | ............. | 709/238 |
| 7,096,248 B2 * | 8/2006 | Masters et al. | ............. | 709/201 |
| 7,107,273 B2 * | 9/2006 | Ohata et al. | ........................ | 1/1 |
| 7,209,439 B2 * | 4/2007 | Rawlins et al. | .............. | 370/230 |
| 7,217,887 B2 | 5/2007 | Ho | | |
| 7,254,645 B2 * | 8/2007 | Nishi | ......................... | 709/249 |
| 7,287,076 B2 * | 10/2007 | Ewanchuk et al. | .......... | 709/224 |
| 7,499,458 B2 * | 3/2009 | McDysan et al. | .......... | 370/396 |
| 7,552,438 B1 * | 6/2009 | Werme et al. | ............... | 718/104 |
| 7,584,274 B2 * | 9/2009 | Bond et al. | ................. | 709/223 |
| 7,724,671 B2 * | 5/2010 | Midtun et al. | .............. | 370/236 |
| 7,739,385 B1 * | 6/2010 | Vinjamuri et al. | .......... | 709/226 |
| 2001/0027484 A1 * | 10/2001 | Nishi | ......................... | 709/223 |
| 2002/0112040 A1 * | 8/2002 | Chang et al. | ................ | 709/223 |
| 2002/0165961 A1 * | 11/2002 | Everdell et al. | ............. | 709/225 |
| 2002/0174207 A1 * | 11/2002 | Battou | ........................ | 709/223 |
| 2003/0046396 A1 * | 3/2003 | Richter et al. | ............... | 709/226 |
| 2003/0191829 A1 * | 10/2003 | Masters et al. | ............. | 709/223 |
| 2004/0008688 A1 * | 1/2004 | Matsubara et al. | ..... | 370/395.21 |
| 2005/0076339 A1 * | 4/2005 | Merril et al. | ................ | 718/104 |
| 2006/0072541 A1 * | 4/2006 | Pecus | ......................... | 370/351 |
| 2007/0094374 A1 * | 4/2007 | Karia et al. | ................. | 709/223 |
| 2007/0271369 A1 * | 11/2007 | Aydin et al. | ................. | 709/224 |
| 2008/0040469 A1 * | 2/2008 | Nishi | ......................... | 709/223 |
| 2008/0192630 A1 * | 8/2008 | Klimmek et al. | .......... | 370/230.1 |
| 2008/0201462 A1 * | 8/2008 | Liss et al. | ................... | 709/223 |
| 2008/0219268 A1 * | 9/2008 | Dennison | ................. | 370/395.2 |
| 2009/0013066 A1 * | 1/2009 | Pecus | ......................... | 709/223 |

\* cited by examiner

*Primary Examiner*—Michael Won
(74) *Attorney, Agent, or Firm*—Cantor Colburn LLP

(57) ABSTRACT

Exemplary embodiments of the present invention relate to a network element device, wherein the device monitors and reports any changes to the availability status its internal resources. As such, the network element device supports the real-time capacity management of a networked managements system, wherein no polling information is required to be transmitted from a either a management system or a network system management device to the network element device.

15 Claims, 3 Drawing Sheets

DEVICES, METHODS, AND COMPUTER PROGRAM PRODUCTS FOR REAL-TIME RESOURCE CAPACITY MANAGEMENT

BACKGROUND

1. Field of the Invention

Exemplary embodiments relate generally to the management of network systems, and more particularly, to the real-time management of network resources.

2. Description of Background

Generally, network management systems are configured to accomplish a plurality of functions, including information consolidation, capacity management, network element performance monitoring, and the capability to institute on-the-fly system configuration changes. In particular, capacity management functions are vital to maintaining equilibrium within an operating system environment. However, presently implemented operations environments utilize capacity management tools, but the functions of these capacity management tools are not truly performed in real-time.

For example, within a typical operating system environment differing state information in regard to respective system resources can be dispersed over multiple network systems. Therefore, there may be a misrepresentation in the accounting of the actual number of available resources within an operating system environment. Thus, within any operating system it may be virtually impossible in real-time to account for the exact number of available resources in addition to the resources that are currently in use, thereby increasing the potential for the provisioning of an erroneous view of the available resources within an operating environment.

BRIEF SUMMARY

Exemplary embodiments include a network element device for that is configured to deliver network element resource capacity information. The network element device comprises a controller, wherein the controller comprises a processor and memory. The controller is also configured to deliver network element resource availability information to at least one network management system. The network device also comprises a network interface in that is communication with the controller. The network interface is configured to employ at least one data routing protocol and at least one network element capacity management protocol in order to receive and transmit information between the network element device and network management system or intermediary network management device.

Additional exemplary embodiments include a network element device for that is configured to deliver network element resource capacity information. The network element device comprises a controller, wherein the controller comprises a processor and memory. The controller is also configured to deliver network element resource availability information to at least one network management system in the event of a change in the operational state of a resource that is comprised within the network element device. The network device also comprises a network interface in that is communication with the controller. The network interface is configured to employ at least one data routing protocol and at least one network element capacity management protocol in order to receive and transmit information between the network element device and network management system or intermediary network management device.

Yet further exemplary embodiments include a method for the real-time delivering of network element resource capacity information. The method comprises receiving a request at a network element device for network element resource capacity information from at least one network management system and in response to the request for information delivering the network element resource capacity information to the least one network management system. The method also comprises monitoring the network element device for changes in the operational states of resources comprised within the network element device and delivering updated network element resource capacity information to the at least one network management system in the event that a change in the operational state of a network element resource is identified.

Yet additional exemplary embodiments include computer program product that includes a computer readable medium useable by a processor, the medium having stored thereon a sequence of instructions which, when executed by the processor, causes the processor to deliver network element resource capacity information. As such, the computer program product performs the operations of receiving a request at a network element device for network element resource capacity information from at least one network management system. In response to the request for information the computer program product delivers the network element resource capacity information to the least one network element in response to the request for network element resource capacity information. The computer program product also performs the operation of monitoring the network element device for changes in the operational states of resources comprised within the network element device and delivering updated network element resource capacity information to the at least one network management system in the event that a change in the operational state of a network element resource is identified.

Other systems, methods, and/or computer program products according to embodiments will be or become apparent to one with skill in the art upon review of the following drawings and detailed description. It is intended that all such additional systems, methods, and/or computer program products be included within this description, be within the scope of the exemplary embodiments, and be protected by the accompanying claims.

BRIEF DESCRIPTION OF DRAWINGS

Referring now to the drawings wherein like elements are numbered alike in the several FIGURES.

The detailed description explains the exemplary embodiments, together with advantages and features, by way of example with reference to the drawings.

DETAILED DESCRIPTION OF EXEMPLARY EMBODIMENTS

One or more exemplary embodiments of the invention are described below in detail. The disclosed embodiments are intended to be illustrative only since numerous modifications and variations therein will be apparent to those of ordinary skill in the art.

Aspects of the exemplary embodiment of the present invention can be implemented within conventional networked computing system environments comprising hardware and software elements. Specifically, the methodologies of the present invention can be implemented as add-on software to program networked element devices to accomplish the prescribed tasks of the present invention as described below.

Figure 1:
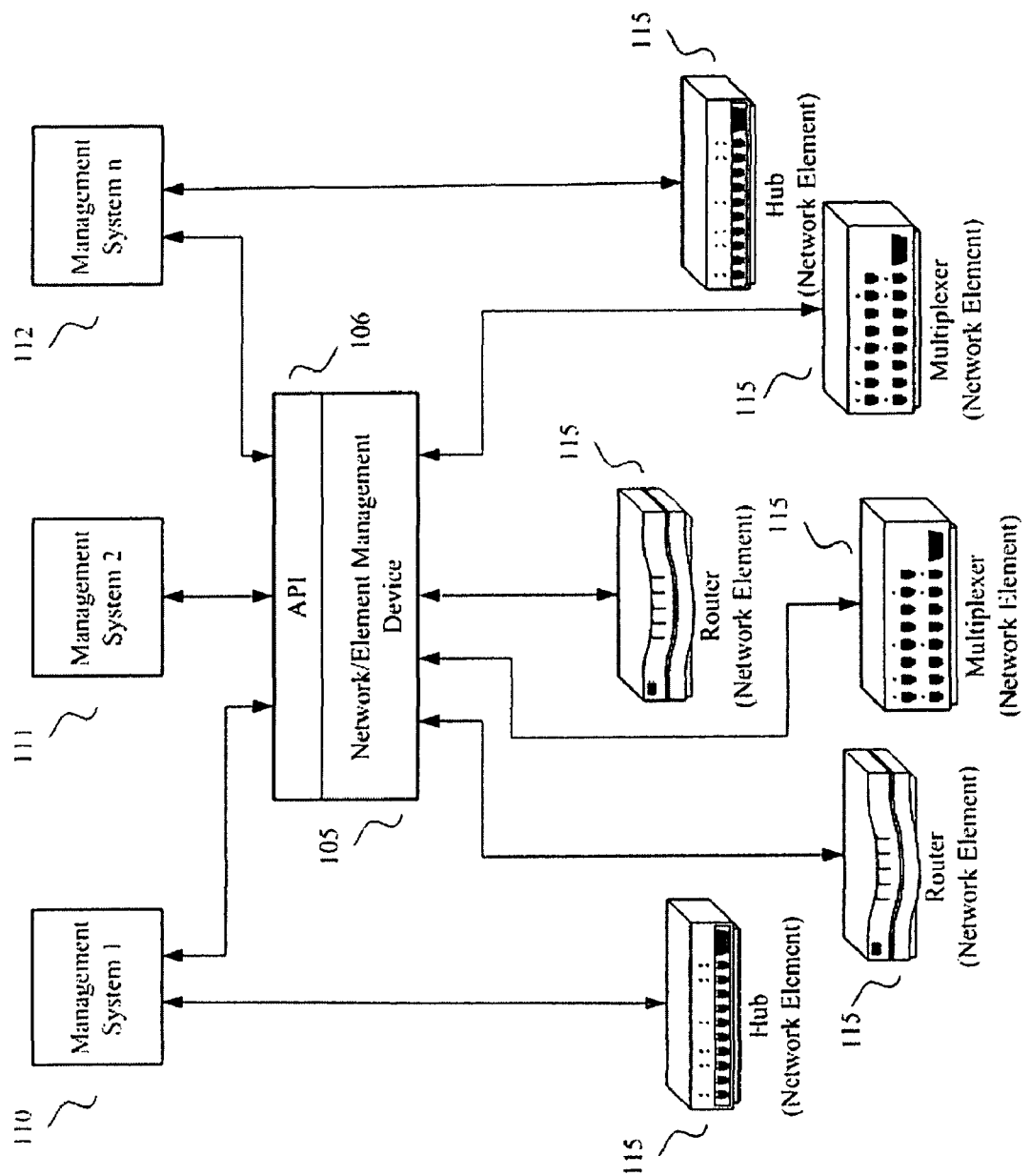
FIG. 1 illustrates a network/element management device interfaced with a plurality of management systems and network elements in accordance with exemplary embodiments of the present invention.

An exemplary network operating environment is illustrated in FIG. 1. As shown, pluralities of management systems 110, 111, 112, and a network/element management device 105 are associated with a plurality of network element resources 115. As shown, the exemplary network element devices 115 comprise—but are not limited to—hub, router, and multiplexer devices. Within the exemplary embodiments, the network element devices 115 can be in direct network communication with a management system (110, 111, 112), or network communication between a network device 115 and a management system 110, 111, 112 can be facilitated via the network/element management device 105. As shown in FIG. 1, the network/element management device 105 comprises an application programming interface 106 (API). The API 106 as shown is configured to facilitate the communication and service operations between the network/element management device 105 and any application requests that the device 105 may receive from externally executing applications via the management systems 110, 111, 112. In accordance with exemplary embodiments, prior to engaging in interactive network operational tasks, the network management systems 110, 111, 112 and the network/element management device 105 deliver registration information to the respective network element devices 115 to whose resources that the network management systems 110, 11, 112, and the network/element management device 105 desires to utilize.

Exemplary embodiments provide for a device and a methodology for the gathering, provisioning, and delivery of real-time system resource capacity information from a network element device 115 to a management system 110, 111, 112, or a network/element management device 105. The exemplary embodiments are supported by the implementation of a standardized network element 115 resource advertisement protocol. In operation, management systems 110, 111, 112 and network/element management device 115 transmit a one-time initial request for information regarding the availability or the capacity of a network element device's 115 resources to handle any operational requests that management system 110, 111, 112 may need serviced by the network element device 115. In response to the initial request for information, the network element device 115 transmits a listing of its current resources to the requesting management system 110, 111, 112 or network/element management device 105. The resource listing transmitted by the network device 115 also includes a listing of the network element device's resources that are currently in-use and that are currently available.

Within the exemplary embodiments, after the transmittal of the initial resource report to the requesting management system 110, 111, 112 and/or network/element management device 105, the network element 115 will deliver any changes to the operational status or state of its internal resources to the networked management system 110, 111, 112 or network/element management device 105. In essence, the network/element management device 105 takes over the network element 115 monitoring capacity for the network management system (110, 111, and 112), according to exemplary embodiments. Therefore, in the event that an application issues a request to use a network element 115 resource that is associated with the management system 110, 111, 112 or the network/element management device 105, the management system 110, 111, 112 that is associated with the application does not need to affirmatively poll the associated network element 115 to determine if the network element is available for the application's operational purposes.

Thus, in accordance with exemplary embodiments, within the operational parameters of the management system (110, 111, and 112) it will no longer be necessary to periodically poll each of the management system's associated network elements 115 for their operational states, since the network element device 115 reports its current operational state and any subsequent changes to its operational state to the management system 110, 111, 112 or network/element management device 105. As such, each time a management system's (110, 111, and 112) associated network element device 115 resource is occupied, released, add, or deleted within the network element device 115 each management system (110, 111, and 112) that is associated with the network element resource 115 receives an appropriate update on the impacted network element device's 115 resources. This update may include the total number of network element resources 115 that are supported by the management system (110, 111, and 112) and the total number of network element device 115 resources that are in use or available.

Within further exemplary embodiments of the present invention a keep-alive mechanism (i.e., a heartbeat signal) is implemented to periodically alert the network management system 110, 111, 112 and the network/element management device 105 of the continued presence of a respective network element device 115 within a network environment. The operational states for the network element resources 115 can be reported to exist in a variety of states (e.g., available, reserved, etc.). Additionally, the management systems (110, 111, and 112) retain the option to periodically request intermediate network element device 115 resource reports detailing specific information in regard to a set or subset of the network element device 115 resources.

Figure 2:
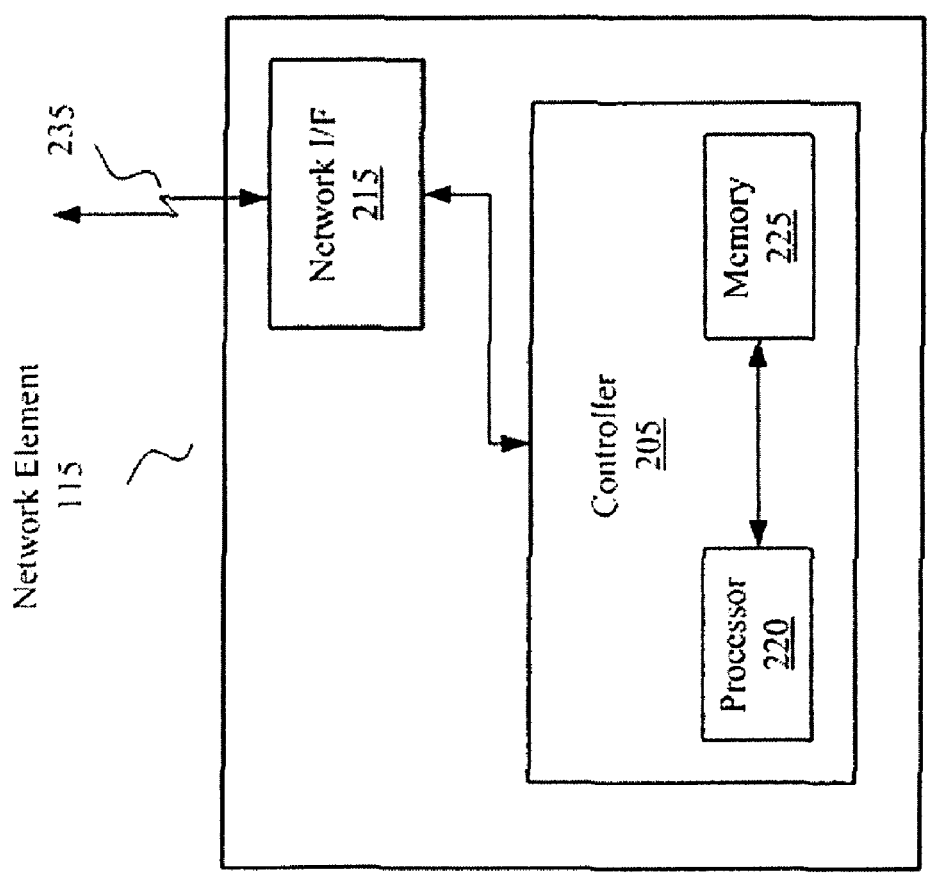
FIG. 2 illustrates a network element in accordance with exemplary embodiments of the present invention.

As shown in FIG. 2, the network element device 115 comprises a controller 205, a storage device 210, and a network interface 215. The controller 205 further comprises a processor 220, and a memory 225, wherein the memory 225 and storage device 210 can comprise a non-volatile memory. The controller 205 is configured for operation via software elements (not shown), wherein the software elements are executable in the main memory 225 of the controller 205, but as persons skilled in the art will understand the elements may not in actuality reside simultaneously or in their entireties in the memory 225. The network/element management device 105 may comprise additional hardware and software elements, but they are not shown for purposes of clarity. It must be noted that software elements can be loaded into the controller 205 via the network interface 215.

With exemplary embodiments of the present invention, the controller 205 is configured to transmit resource availability information from the network elements 115 to the management systems 110, 111, 112 and the network/element management device 105 via the network interface 215. As shown, the network interface 215 is in communication with the controller 205 and is configured to employ at least one data routing protocol (e.g., IP, etc) and at least one standardized network management protocol (e.g., SNMP) in order to receive and transmit information 235. Within the exemplary embodiments, the standardized network management protocol would allow the management systems 110, 111, 112 and the network/element management device 105 to learn about each resource that is comprised within a network element device 115, the maximum number of the resources, and how many resources are in-use or currently available. Further, the management protocol is asynchronous in nature, that is, the protocol allows for the network element device 115 to deliver reports of its internal state changes rather than rely on the management systems 110, 111, 112 or the network/element management device's 105 need to continuously poll the network element device in order to gather the specified network element device 115 resource information. Within further exemplary embodiments, in the instances that IP is not supported within a networking environment, proxy elements can be implemented within the networking architecture in order to facilitate the delivery of data.

Figure 3:
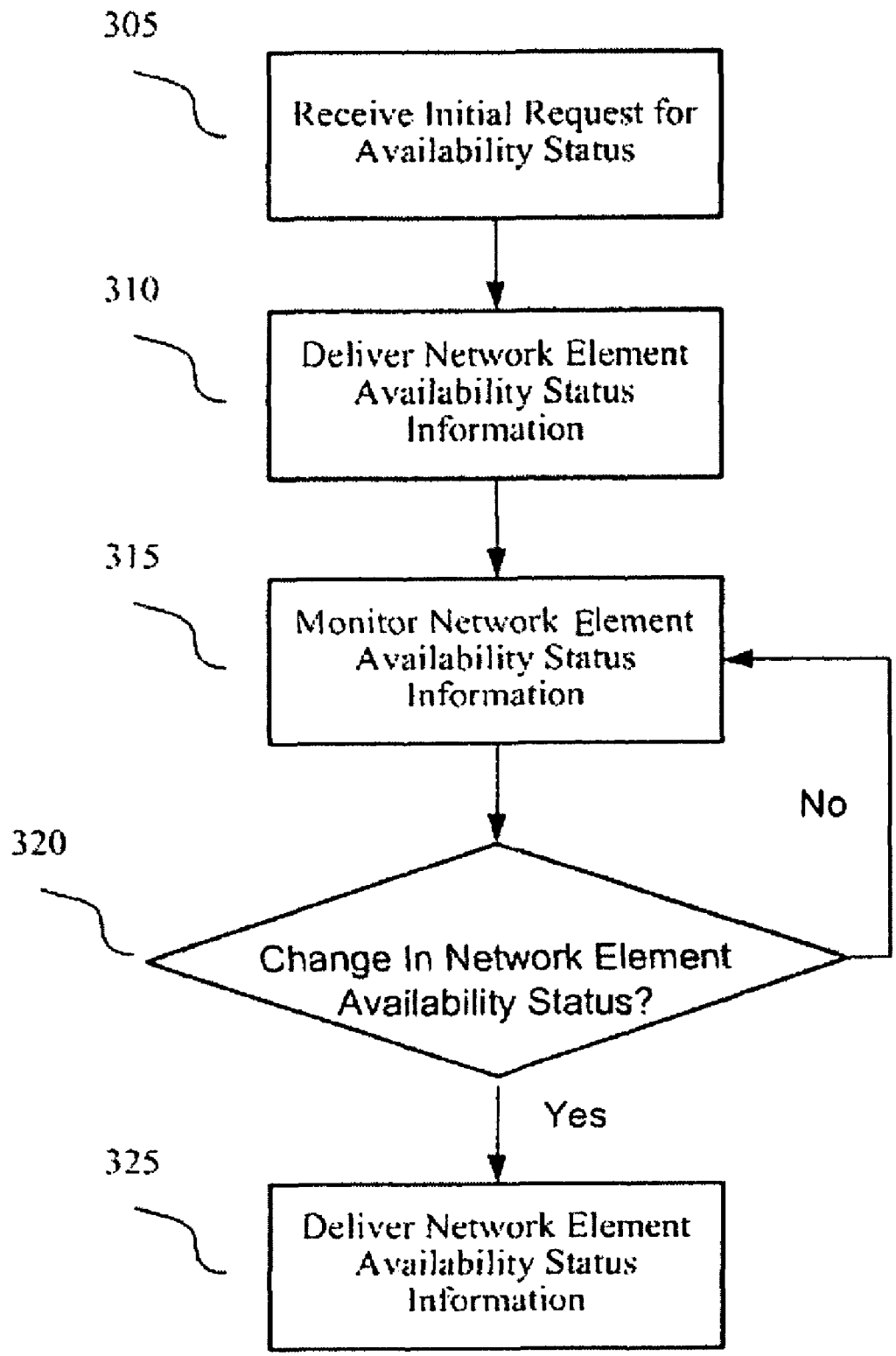
FIG. 3 is a flow diagram detailing a method for the delivering of network element resource capacity information in accordance with exemplary embodiments of the present invention.

FIG. 3 shows a flow diagram detailing a method for the delivery and reporting of network element resource capacity information in accordance with exemplary embodiments of the present invention. At step 305 a request for network element resource availability status information from a management system 110, 111, 112 or a network/element management device 105 is received at a network element 115. At step 310, in response to the request for resource availability status information, the network element 115 delivers the current resource availability status information to the requesting network system (110, 111, 112) or device (105). According to exemplary embodiments, the network element resource availability information indicates how many of the network element resources 115 are in use and how many of the network element resources 115 are available. At step 315 the network element device 115 monitors its internal resource operations.

At step 320, a determination is made to if there has been a change in the availability status of a network element device's 115 resources. If it is determined that no change in resource availability has occurred, then the network device 115 continues its internal monitoring operations. If a determination is made that a change in the resource availability status of a network element device 115 resource has occurred, then at step 325 the network element device 115 delivers this update resource availability status information to all management systems 110, 11, 112, and network/element management devices 105 with which the network element device is in network communication.

As described above, the exemplary embodiments can be in the form of computer-implemented processes and devices for practicing those processes. The exemplary embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes a device for practicing the exemplary embodiments. The exemplary embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the exemplary embodiments. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc., do not denote any order or importance, but rather the terms first, second, etc., are used to distinguish one element from another. Furthermore, the use of the terms a, an, etc., do not denote a limitation of quantity, but rather denote the presence of at least one of the referenced item.

What is claimed:

1. A network element device, the network element device being configured to deliver network element resource capacity information, the network element device comprising:
    a controller, wherein the controller comprises a processor and memory, the controller being configured to deliver network element resource availability information to at least one network management system; and
    a network interface in communication with the controller, the network interface being configured to employ a data routing protocol and a network element capacity management protocol in order to receive and transmit information;
    wherein the network element resource availability information, configured to be delivered by the controller, comprises a total number of resources, a total number of the resources that are in use, and a total number of the resources that are available;
    wherein the network element resource availability information comprises a status for each of the resources and the status for each of the resources includes occupied, released, added, and deleted;
    where in the event that there is a change in an operational state of a network element resource the network element device will deliver updated network element resource availability information to the at least one network management system; and
    wherein the controller is configured to periodically deliver a keep-alive signal to the at least one network management system in order to alert the at least one network management system of the presence of the network element device.

2. The device of claim 1, wherein communication between the network element device and a network management system is facilitated via an application programming interface (API) residing at a network management device.

3. The device of claim 1, wherein the controller is configured to receive an initial request for network element resource availability information from the at least one network management system.

4. The device of claim 1, wherein in response to determining that a change has occurred to the availability for a changed resource, the controller is configured to provide the change of availability for the changed resource in the network element availability information.

5. The device of claim 1, wherein in response to receiving a request for network element resource availability the controller is configured to transmit network element resource availability information to the requesting management system.

6. A network element device, the network element device being configured to deliver network element resource capacity information, the network element device comprising:
   a controller, wherein the controller comprises a processor and memory, the controller being configured to deliver network element resource availability information to at least one network management system, where in the event that there is a change in an operational state of a network element resource the controller will deliver updated network element resource availability information to the at least one network management system; and
   a network interface in communication with the controller, the network interface being configured to employ a data routing protocol and a network element capacity management protocol in order to receive and transmit information;
   wherein the network element resource availability information, configured to be delivered by the controller, comprises a total number of resources, a total number of the resources that are in use, and a total number of the resources that are available;
   wherein the network element resource availability information comprises a status for each of the resources and the status for each of the resources includes occupied, released, added, and deleted; and
   wherein the controller is configured to periodically deliver a keep-alive signal to the at least one network management system in order to alert the at least one network management system of the presence of the network element device.

7. The device of claim 6, wherein communication between the network element device and a network management system is facilitated via an application programming interface (API) residing at a network management device.

8. A method for the real-time delivering of network element resource capacity information, the method comprising:
   receiving a request at a network element device for network element resource capacity information from at least one network management system;
   delivering the network element resource capacity information to the least one network element in response to the request for network element resource capacity information;
   monitoring the network element device for changes in the operational states of resources comprised within the network element device; and
   delivering updated network element resource capacity information to the at least one network management system in the event that a change in the operational state of a network element resource is identified;
   wherein the network element resource capacity information, configured to be delivered by the network element device, comprises a total number of resources, a total number of the resources that are in use, and a total number of the resources that are available;
   wherein the network element resource capacity information comprises a status for each of the resources and the status for each of the resources includes occupied, released, added, and deleted; and
   wherein the controller is configured to periodically deliver a keep-alive signal to the at least one network management system in order to alert the at least one network management system of the presence of the network element device.

9. The method of claim 8, wherein communication between the network element device and a network management system is facilitated via an application programming interface (API) residing at a network management device.

10. The method of claim 8, further comprising receiving an initial request for network element resource availability information from the at least one network management system.

11. The method of claim 8, wherein the network element resource capacity information indicates the number of resources within the network element device that are in use.

12. A computer program product that includes a non-transitory computer readable medium useable by a processor, the computer readable medium having stored thereon a sequence of instructions which, when executed by the processor, causes the processor to deliver network element resource capacity information by:
   receiving a request at a network element device for network element resource capacity information from at least one network management system;
   delivering the network element resource capacity information to the least one network element in response to the request for network element resource capacity information;
   monitoring the network element device for changes in the operational states of resources comprised within the network element device; and
   delivering updated network element resource capacity information to the at least one network management system in the event that a change in the operational state of a network element resource is identified;
   wherein the network element resource capacity information, configured to be delivered by the network element device, comprises a total number of resources, a total number of the resources that are in use, and a total number of the resources that are available;
   wherein the network element resource capacity information comprises a status for each of the resources and the status for each of the resources includes occupied, released, added, and deleted; and
   wherein the controller is configured to periodically deliver a keep-alive signal to the at least one network management system in order to alert the at least one network management system of the presence of the network element device.

13. The method of claim 12, wherein communication between the network element device and a network management system is facilitated via an application programming interface (API) residing at a network management device.

14. The method of claim 12, further comprising receiving an initial request for network element resource availability information from the at least one network management system.

15. The method of claim 12, wherein the network element resource capacity information indicates the number of resources within the network element device that are in use.

* * * * *